US008146815B2

(12) United States Patent
Yumoto (10) Patent No.: US 8,146,815 B2
(45) Date of Patent: Apr. 3, 2012

(54) BAR CODE GENERATOR (75) Inventor: Chiharu Yumoto, Sodegaura (JP)

(73) Assignee: Canon Finetech Inc., Ibaraki (JP)

( * ) Notice: Subject to any disclaimer, the term of this patent is extended or adjusted under 35 U.S.C. 154(b) by 1084 days.

(21) Appl. No.: 12/032,563

(22) Filed: Feb. 15, 2008

(65) Prior Publication Data

US 2008/0203177 A1 Aug. 28, 2008

(30) Foreign Application Priority Data

Feb. 26, 2007 (JP) ................................. 2007-046000

(51) Int. Cl.
G06K 7/10 (2006.01)

(52) U.S. Cl. ......... 235/462.01; 235/462.02; 235/462.08; 235/462.16; 235/494

(58) Field of Classification Search .................. 235/375, 235/383, 462.01, 462.16, 494, 462.02, 462.15; 382/81; 705/401
See application file for complete search history.

(56) References Cited

U.S. PATENT DOCUMENTS

| 4,130,243 | A | * | 12/1978 | Stevens | 235/487 |
| 4,845,514 | A | * | 7/1989 | Mitsushima et al. | 347/194 |
| 5,007,748 | A | * | 4/1991 | Lee et al. | 400/103 |
| 5,025,397 | A | * | 6/1991 | Suzuki | 358/1.18 |
| 5,848,202 | A | * | 12/1998 | D'Eri et al. | 382/306 |
| 6,032,863 | A | * | 3/2000 | Nethery, III | 235/462.07 |
| 6,896,178 | B2 | | 5/2005 | Hiramoto | |
| 2002/0113125 | A1 | | 8/2002 | Schuessler et al. | |
| 2002/0185540 | A1 | * | 12/2002 | Hashimoto et al. | 235/462.25 |
| 2005/0234835 | A1 | * | 10/2005 | Stonoha et al. | 705/401 |

FOREIGN PATENT DOCUMENTS

| JP | 05-054165 | | 3/1993 |
| JP | 08-123886 | A | 5/1996 |
| JP | 2000-158720 | | 6/2000 |
| JP | 2000-158720 | A | 6/2000 |
| JP | 2004-295523 | A | 10/2004 |
| JP | 2005-022383 | | 1/2005 |
| WO | 02/28655 | A1 | 4/2002 |

* cited by examiner

Primary Examiner — Tuyen K Vo
(74) Attorney, Agent, or Firm — patenttm.us (57) ABSTRACT The present invention is directed to a bar code generator which improves a print quality of a bar code and further enhances reading precision thereof, as to both vertical and horizontal bar codes. In this bar code generator, bar width information is set independently for each of the vertical and horizontal bar codes, as a precondition for printing the vertical and horizontal bar codes, selectively. When the bar code is printed (S802), it is determined whether the bar code is vertical or horizontal (S803), and according to the result of the determination, the bar width information of the determined bar code orientation is read out for drawing an image of the bar code (S804, S805, and S806). The result being drawn is transmitted to the printer, and the bar code is printed.

6 Claims, 11 Drawing Sheets

BAR CODE GENERATOR

DETAILED DESCRIPTION

1. Field of the Invention

The present invention relates to a bar code generator having a capability to correct a bar width of a bar code, when the bar code is printed by an ink jet printer.

2. Related Art

Conventionally, when a bar code is printed by an ink jet printer, it is general to form bars of the bar code by recorded dots, in other words, a black bar is represented by a recorded part and a white bar is represented by a non-recorded part (space). On this occasion, when the ratio in width of the black bar to the white bar is set to be "1 to 1", there is a possibility that the recorded part of the black bar is blurred and spreads out, and eventually, the ratio in width of the black bar to the white bar does not become "1 to 1".

In order to achieve the 1-to-1 ratio between the black bar and the white bar, it is common to make corrections, by recording the black bar relatively thinner. As a method of making such a correction, there are some techniques such as a technique for inputting a ratio between the black bar and the white bar, and a technique for specifying how many dots in width are used for forming each of the black bar and the white bar (see Japanese Unexamined Patent Application Publication No. 5-54165).

There is known another technique which changes the amount of ink, a driving method, and the like, according to the direction in which printing of the bar code is performed (see Japanese Unexamined Patent Application Publication No. 2005-022383).

In the meantime, recent years, there are some cases where a manufacturer offers only a printing unit for a printer, and an OEM (Original Equipment Manufacturing) develops a transporting unit for the printer unit so as to complete a printer.

In the printer that is manufactured according to the process as described above, a precision in transporting a print medium, or the like, may vary depending individual devices, and there may be a difference in vertical and horizontal resolutions of the printer head. Therefore, a result of the printed output of the vertical bar code may not agree with the result of the printed output of the horizontal bar code, causing disagreement in reading precision between the vertical and horizontal bar codes. Therefore, there occurs a problem that a reading accuracy of the bar code is deteriorated.

Japanese Unexamined Patent Application Publication No. 2000-158720 suggests a technique in which when a bar code pattern is generated from bar code character data by using a pattern conversion table, both vertical and horizontal bar codes are selectively generated without increasing an occupied memory capacity. However, this publicly known technique aims at reductions of a necessary memory capacity and the number of times of accessing a memory, and it does not consider the variation in recording precision of the bar code, which occurs when the bar code orientation is changed.

The present invention has been made considering the background as described above and an object of the present invention is to set bar width information independently for each of the vertical and horizontal bar codes, and the bar width of the bar code is changed independently according to the orientation of the bar code, vertical or horizontal. With this configuration, a printing quality of the bar code can be improved both in vertically and horizontally, and further, the reading precision of the bar code can be enhanced.

SUMMARY OF THE INVENTION

A computer program according to the present invention is capable of selectively printing a vertical bar code and a horizontal bar code which are approximately orthogonal to each other, allowing the computer to execute the steps of: storing bar width information in a storage, independently for each of the vertical and horizontal bar codes, determining, when a bar code is printed, an orientation of the bar code as to whether the bar code is vertical or horizontal, and drawing an image of the bar code by reading out the bar width information of the bar code corresponding to the orientation as a result of determination.

With the configuration above, the bar width information is stored independently for each of the vertical and horizontal bar codes, and an image of the bar code is drawn based on this bar width information. Therefore, it is possible to cope with an error in precision of transporting a print medium, or the like.

More specifically, the computer program further allows the computer to execute the steps of; displaying a bar width set-up screen, including entry fields for inputting bar widths of a black thin bar, a black thick bar, a white thin bar, and a white thick bar, respectively, as to the vertical bar code, and entry fields for inputting bar widths of a black thin bar, a black thick bar, a white thin bar, and a white thick bar, respectively, as to the horizontal bar code, and storing the bar widths inputted from the bar width set-up screen.

The bar width set-up screen may include a check field for setting the same values to the bar widths of corresponding bars between the horizontal and the vertical bar codes, and further, when a checkmark is placed in the check field, the computer program allows the computer to execute the step for setting the bar widths in such a manner that the bar widths of one bar code agree with those of the other bar code between the vertical and horizontal bar codes.

The present invention can be interpreted as a computer readable recording medium which records the computer program as described above. The recording medium may include various disk devices such as DVD, CD, FD, and HDD, and semiconductor memories such as EEPROM, a flash ROM, and the like.

The bar code generator according to the present invention for selectively generating a vertical bar code and a horizontal bar code which are approximately orthogonal to each other, comprises a storage unit for storing bar width information independently for each of the vertical and horizontal bar codes, and a bar code generating unit for generating an image of the bar code based on bar code value being provided, according to a designation of the bar code orientation, by referring to the bar width information corresponding to the bar code orientation being designated.

When the bar code generator is an information processing apparatus, the bar code generator may be provided with a communication interface for sending the image of the bar code being generated to a printer.

When the bar code generator is a printer, the bar code generator generates and prints the image of the bar code based on the bar code value, bar code set-up information, and bar width information, which are given from the outside via the communication interface.

According to the present invention, it is possible to configure the bar width information of the vertical bar code and the bar width information of the horizontal bar code independently, and it is further possible that when printing of the vertical bar code is requested, the bar code is generated by using the bar width information of the vertical bar code, whereas when printing of the horizontal bar code is requested, the bar code is generated by using the bar width information of the horizontal bar code. Therefore, even in different printers, a bar code with a high reading accuracy can be generated regardless of the bar code orientation.

The present invention is particularly effective, in the case where an error in precision in transporting a print medium, or the like, hampers forming of dots that should be uniform both vertically and horizontally.

DETAILED DESCRIPTION OF THE PREFERRED EMBODIMENTS

Hereinafter, preferred embodiments of the present invention will be explained with reference to the accompanying drawings.

Figure 1:
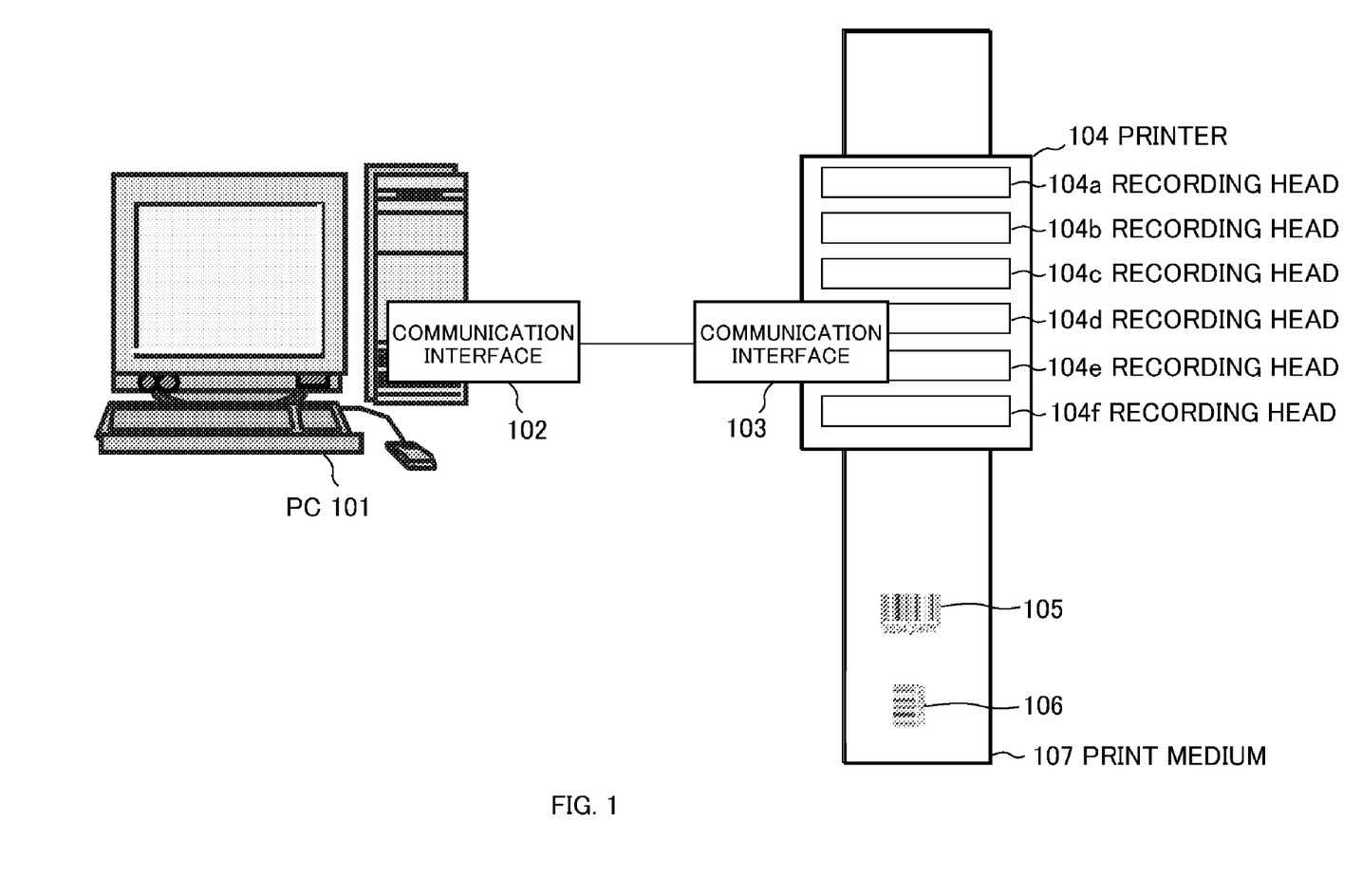
FIG. 1 illustrates a schematic configuration of a recording system according to the present invention.

FIG. 1 illustrates a schematic configuration of the recording system according to the present invention. This recording system is made up of an information processing apparatus (PC: personal computer) 101 and a printer 104 for printing print data, which are connected with each other via a communication interface. As described below, either the PC 101 or the printer 104 may serve as the bar code generator according to the present invention.

The PC 101 is an information processing apparatus for generating print data which is supplied to at least one printer. The PC 101 is connected to the communication interface 103 within the printer 104, via the communication interface 102. By way of example, the communication interface may include a network cable, a USB cable, IEEE 1284, or the like. In the present embodiment, the print data generated in the PC 101 is transferred to the printer 104, by using the USB cable.

The PC 101 executes any of computer programs, such as an application for generating an image, a print control program (a printer driver) and the like, under the control of an operating system. In the present embodiment, the following explanations will be made, assuming that the operating system is "Windows (registered trademark)". The print data is generated by the printer driver.

In the example here, the printer 104 includes six recording heads, i.e., recording heads 104a, 104b, 104c, 104d, 104e, and 104f, which are arranged almost in parallel with one another, and all the recording heads perform recording with black ink. This is to increase the speed in printing. However, it is to be noted that the printer according to the present invention is not limited to this configuration. Details will be explained below. Each of the recording heads is provided with a row of nozzles, made up of plural nozzles (recording elements), which are arranged approximately in the form of a line.

As shown in FIG. 1, a bar code referred to as "vertical bar code" is the one which the printer 104 records in such a manner that each bar of the bar code is vertical with respect to a print medium 107 such as paper, i.e., each bar is recorded along a transporting direction of the print medium 107. On the other hand, a bar code referred to as "horizontal bar code" is the one which the printer 104 records in such a manner that each bar of the bar code is horizontal with respect to the print medium 107. i.e., it is recorded in approximately orthogonal to the transporting direction of the print medium 107. In the example as shown in FIG. 1, the printer 104 prints the vertical bar code 105 and the horizontal bar code 106 on the print medium 107.

Figure 10:
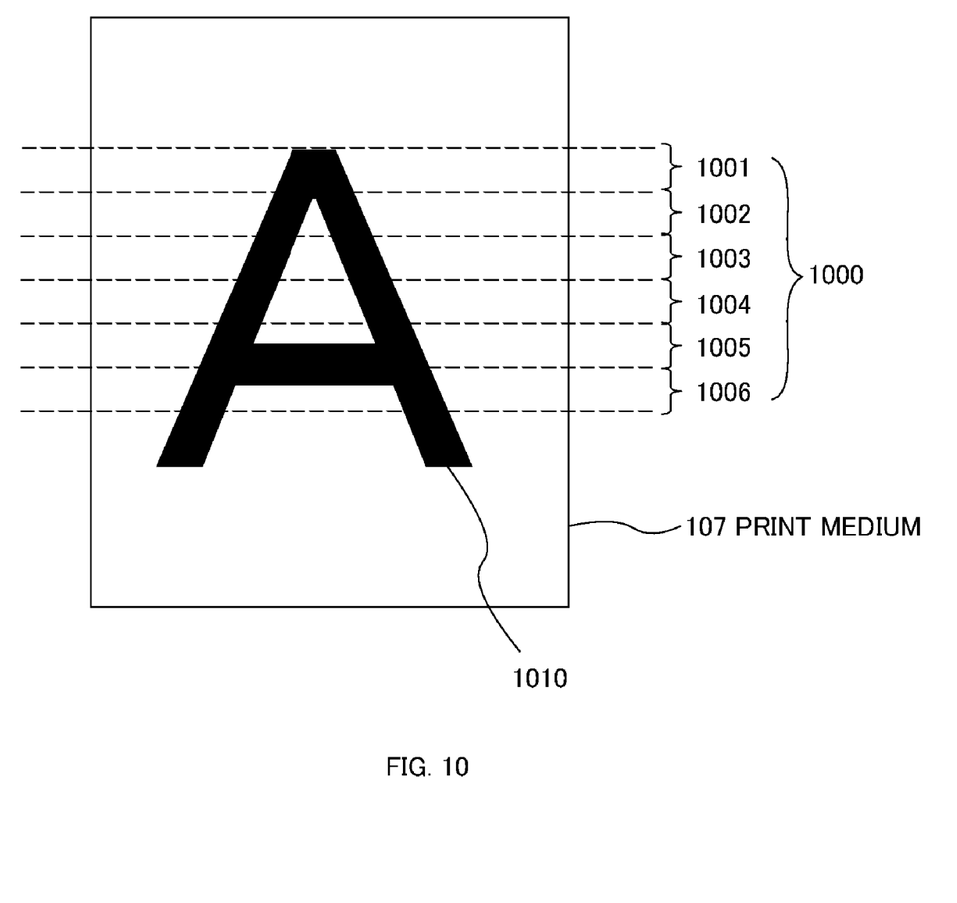
FIG. 10 is an illustration to explain a printing method of a printer that performs high-speed printing according to an embodiment of the present invention.

FIG. 10 is an illustration to explain a printing method of a printer that performs high-speed printing, according to the present embodiment. Here, a situation where a character (image) of "A" 1010 is printed on the print medium 107 is taken as an example. As shown in FIG. 1, the printer includes more than one recording head each provided with the same color ink and one image is created by using these plural recording heads.

The recording heads 104a, 104b, 104c, 104d, 104e, and 104f record an image of a unit recording area 1000. The recording head 104a is in charge of recording the uppermost part 1001, and the recording head 104b is in charge of recording the second part 1002. Similarly, the third part 1003, the fourth part 1004, the fifth part 1005, and the sixth part 1006 are respectively recorded by the recording heads 104c, 104d, 104e, and 104f. As thus described, each of the six recording heads takes partial charge for printing a recording target, and thereby enhancing the recording speed. However, in the recording method as described above, since an image is formed by using the six recording heads, and therefore, the image quality may be subject to the grade of precision in transporting the print medium 107.

Figure 2:
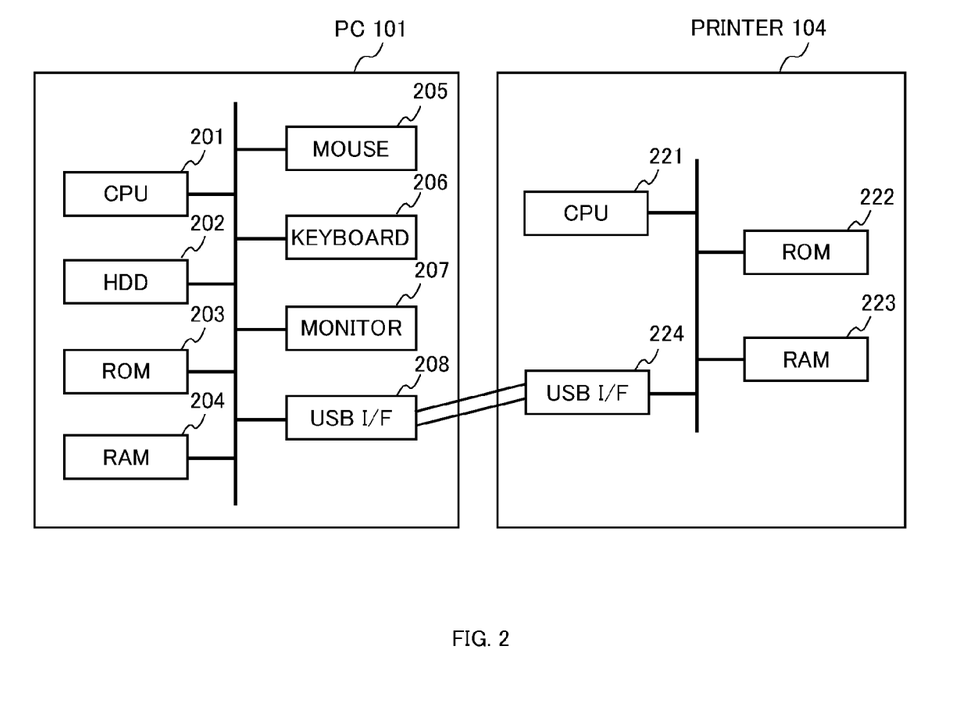
FIG. 2 is a block diagram showing a hardware configuration example of the recording system according to an embodiment of the present invention.

FIG. 2 is a block diagram showing a hardware configuration of the recording system according to the present embodiment.

The PC 101 includes a CPU 201, an HDD 202, an ROM 203, an RAM 204, a mouse 205, a keyboard 206, a monitor 207, and a USB I/F part 208.

The CPU 201 is a central processing unit which exercises software-control over the entire PC 101. The HDD 202 is a large-capacity external storage which stores programs and data in a nonvolatile manner. The ROM 203 is a memory for storing a program for starting up the CPU 201 and fixed data in a nonvolatile manner, and in general, it is read-only memory. However, a rewritable memory such as a flash ROM may be included therein. The RAM 204 is generally a volatile memory, which provides a work area or a temporary storage area for the CPU 201. The mouse 205 is a type of pointing device that is manipulated by the user. The keyboard 206 is an input device for the user to input an instruction, data, and the like. The monitor 207 is a display device such as an LCD and a CRT, for displaying information for the user. The USB I/F part 208 constitutes the communication interface 102 as described above. Generally, an application for generating the print data and a program such as printer driver are stored in the HDD 202, and they are read out into the RAM 204 for execution. Such programs may also be stored in the ROM 203.

The printer 104 includes a CPU 221, an ROM 222, an RAM 223, a USB I/F part 224, and the like. The CPU 221 is a central processing unit which exercises software-control over the entire printer 104. The ROM 222 is a memory for storing a program for operating the printer, which is executed by the CPU 221, and various fixed data, and it is read-only memory in general. However, are writable memory such as a flash ROM may be included therein. The RAM 223 is generally a volatile memory, which provides a work area or a temporary storage area for the CPU 221. The USB I/F part 224 constitutes the communication interface 103 as described above, and it is connected to the USB I/F part 208 in the PC 101 via a USB cable.

Figure 3:
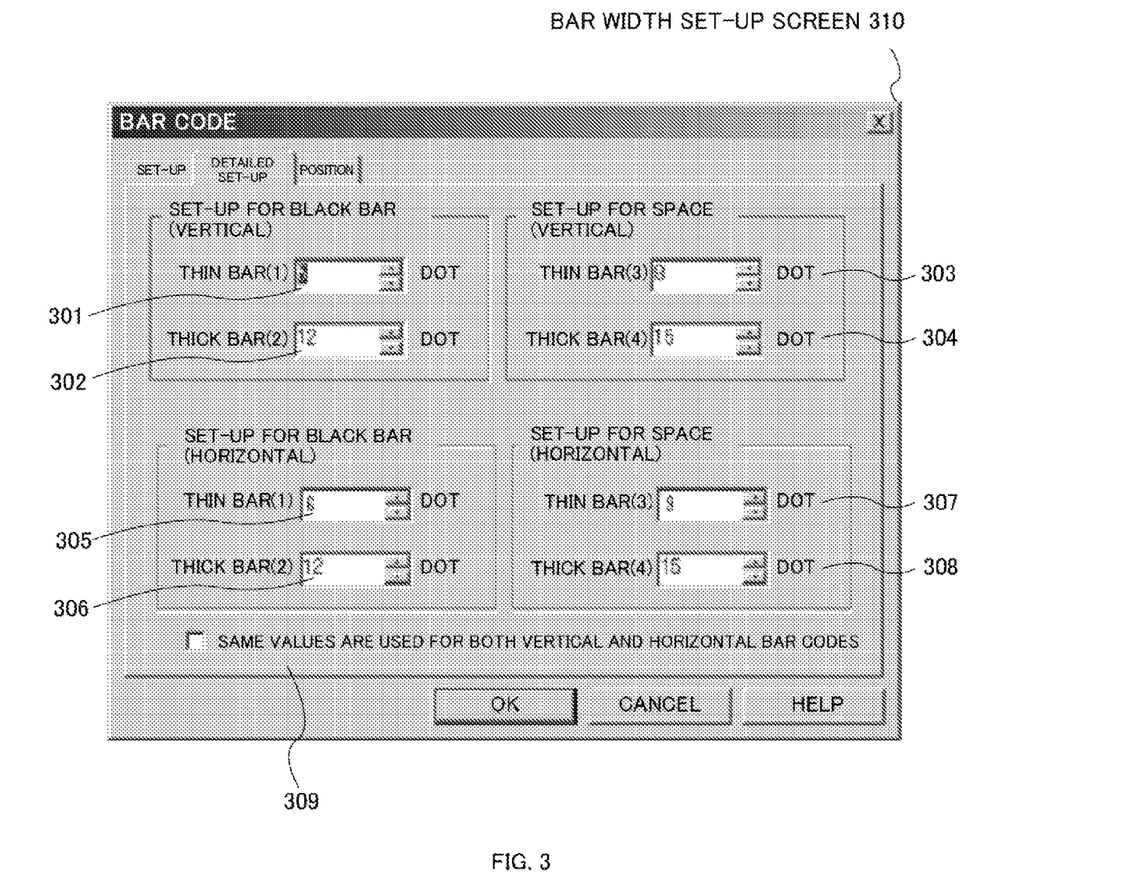
FIG. 3 illustrates a bar width set-up screen according to an embodiment of the present invention.

FIG. 3 illustrates a bar width set-up screen 310 according to the present embodiment. The set-up screen 310 is a user interface screen displayed in the monitor 207 (FIG. 2) of the PC 101, enabling various set-ups for performing the barcode printing, and this screen also allows a correction of the bar code.

Black bars of different widths and white spaces (also referred to as "white bars") of different widths are combined to represent data of a barcode, and the barcode is read and interpreted according to the ratio between and order of the black and white bars. Bar width values being settable in the bar width set-up screen 310 may correspond to the widths of black thin bar, black thick bar, white thin bar, and white thick bar. A type of the bar code may be JAN, EAN128, ITF, UPC, NW-7, CODE 39, or the like. In the present embodiment here, the bar code type is assumed as the NW-7. Therefore, the bar width set-up values of the bar code are set to be binary, thin or thick, as to each of the black bar and the white bar. However, the bar code of the present invention is not limited to NW-7. When four-valued bar code is inputted, input fields for the four values are prepared in the bar width set-up screen.

After the bar widths are set, the vertical bar code is formed by using; the black bar set-up values 301 and 302 of the bar width information of the vertical bar code, and the white bar set-up values 303 and 304 of the bar width information of the vertical bar code. Similarly, the horizontal bar code is formed by using; the black bar set-up values 305 and 306 of the bar width information of the horizontal bar code, and the white bar set-up values 307 and 308 of the bar width information of the horizontal bar code. A way how to form the bar code will be described below.

It is to be noted that when a checkmark is placed in a check box (check field) 309 of "SAME VALUES ARE USED FOR BOTH VERTICAL AND HORIZONTAL BAR CODES", the same values as the set-up values for one bar code (e.g., vertical bar code) are set as the set-up values for the other bar code (e.g., horizontal bar code).

Figure 4A:
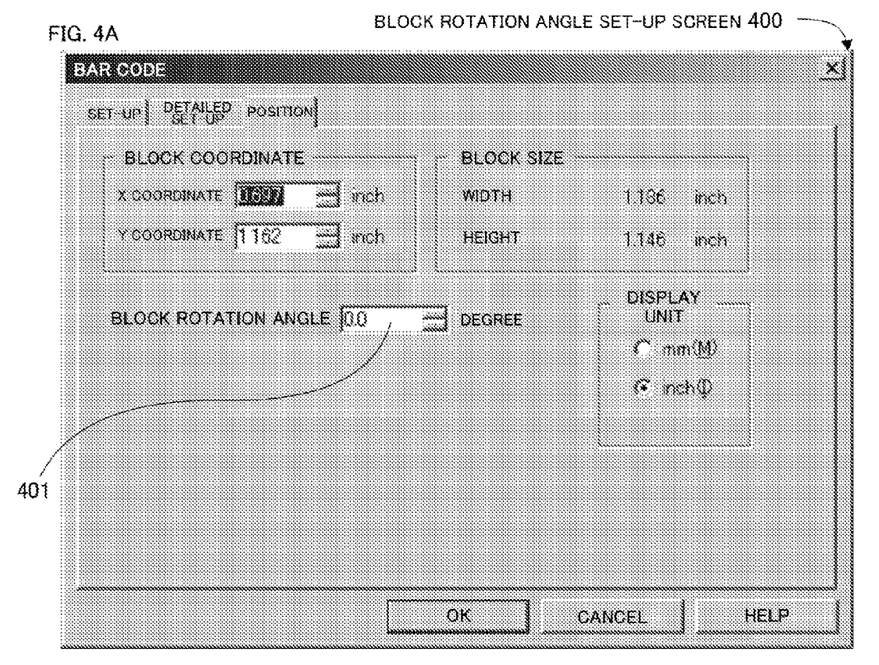
FIG. 4A and FIG. 4B illustrate block rotation angle set-up screen for setting a rotation angle of a bar code according to an embodiment of the present invention.
Figure 4B:
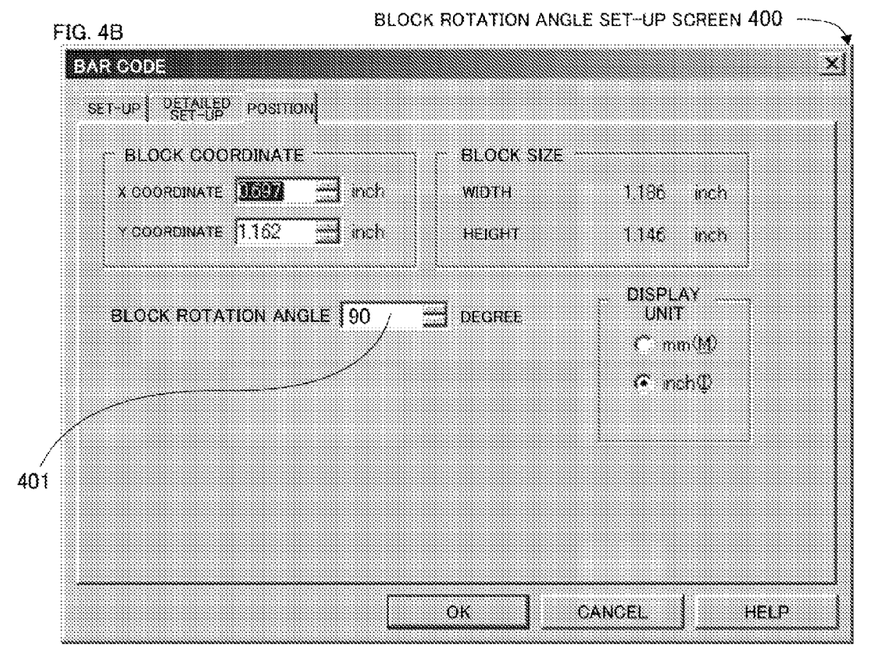

Next, with reference to FIG. 4A and FIG. 4B, a block rotation angle set-up screen 400 for setting a rotation angle of the bar code will be explained. This screen is a property screen when a bar code is inserted on the application. As shown in FIG. 4A, if the rotation angle 401 of a block within the block rotation angle set-up screen 400 is 0 degree (or 180 degrees), it is assumed that the bar code is vertical. On the other hand, as shown in FIG. 4B, if the rotation angle 401 of a block is 90 degrees (or 270 degrees), it is assumed that the bar code is horizontal. When the "OK" button on the screen is chosen, the bar code displayed on the application is rotated.

Figure 5:
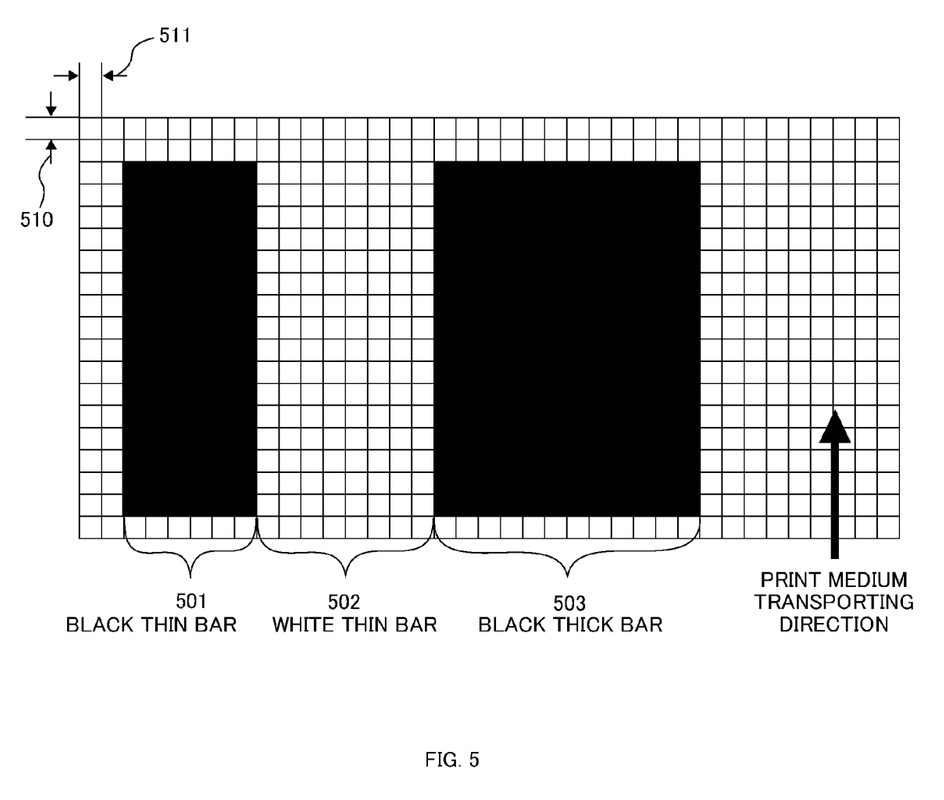
FIG. 5 is an illustration to explain a vertical bar code drawing method according to an embodiment of the present invention.

FIG. 5 is an illustration to explain a vertical bar code drawing method.

The PC 101 (FIG. 1) transmits to the printer, binary information representing ON/OFF data for each dot. Therefore, the bar width set-up is performed in units of dot in the PC 101. One dot corresponds to one pixel of drawing information having the vertical size 510 and lateral size 511. As for the thin bar 501, if the black thin bar is set to six dots in the set-up of FIG. 3, the black bar corresponding to the width of six dots is created when the black thin bar is drawn. As for the white bar 502, if the white thin bar is set to eight dots in the set-up of FIG. 3, the white bar corresponding to the width of eight dots is created when the white thin bar is drawn. In a similar manner, the bar width is set in units of dot for the black thick bar 503 and the white thick bar (not illustrated).

Figure 6:
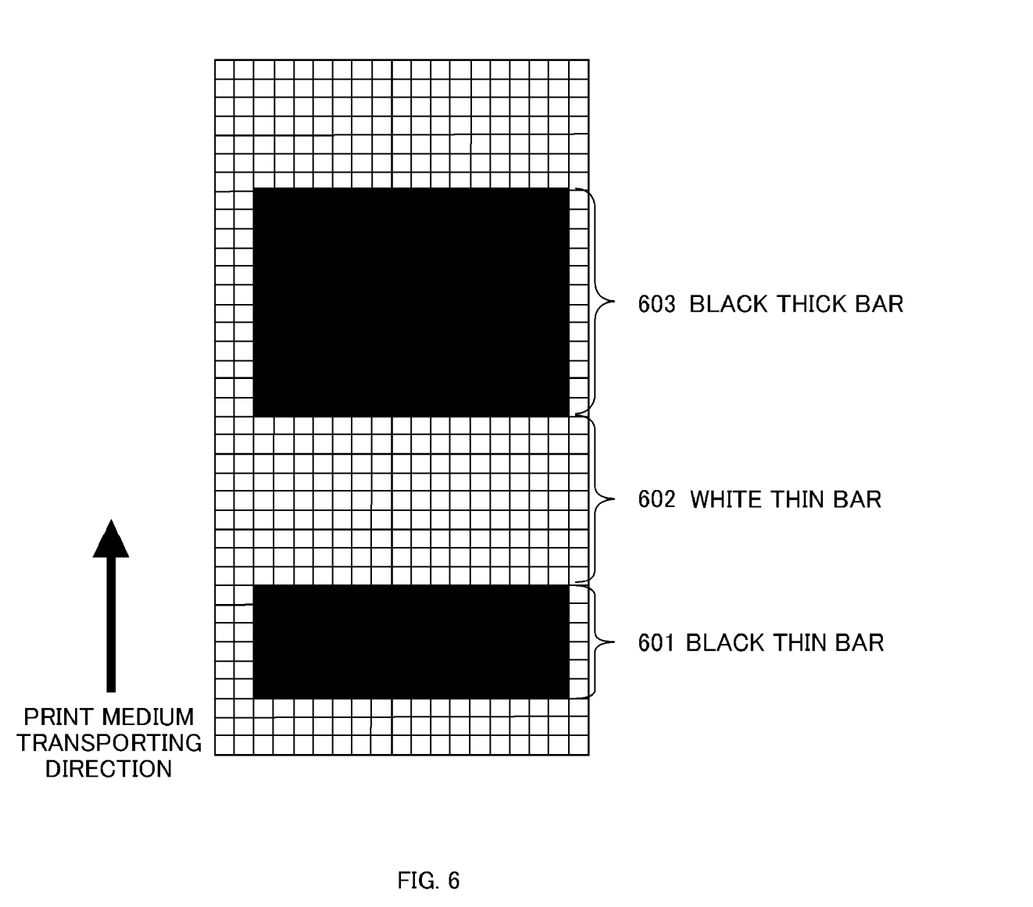
FIG. 6 is an illustration to explain a horizontal bar code drawing method according to an embodiment of the present invention.

FIG. 6 is an illustration to explain the drawing method of the horizontal bar code, in a similar manner as shown in FIG. 5.

As for the black thin bar 601, if the black thin bar is set to six dots in the set-up of FIG. 3, the black bar corresponding to vertical six dots is created when the black thin bar is drawn. As for the white bar 602, if the white thin bar is set to nine dots in the set-up of FIG. 3, the white bar corresponding to vertical nine dots is created when the white thin bar is drawn. Similarly, as for the black thick bar 603 and the white thick bar (not illustrated), the bar width is set in units of dot.

Figure 7:
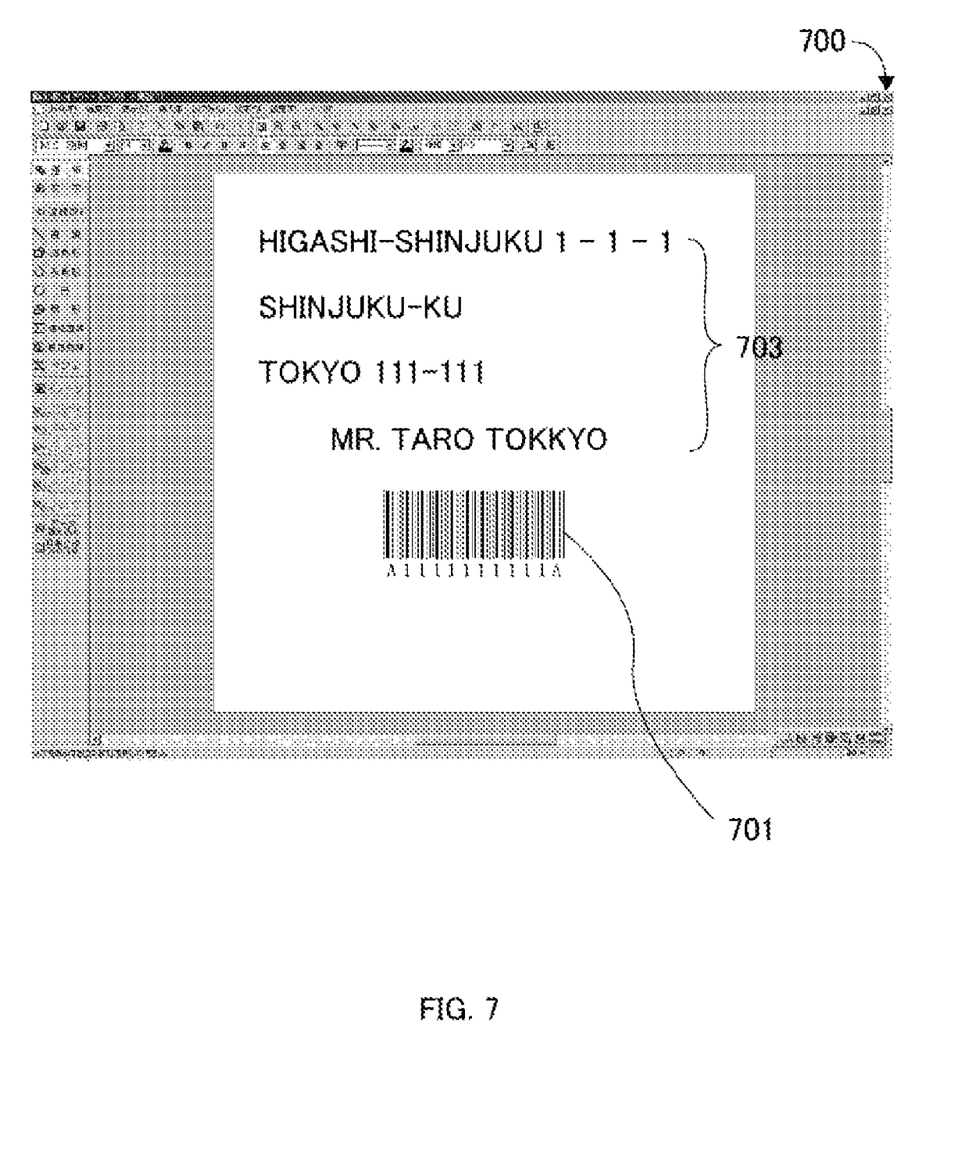
FIG. 7 illustrates an example of a display screen image of an application which performs bar code printing according to an embodiment of the present invention.

FIG. 7 illustrates an example of a display screen 700 of the application which performs bar code printing. In this application, a bar code and other character information are created, and the display screen 700 displays a bar code print part 701 and other character information 703. As for the bar code print part 701, the application generates itself drawing information, for dots of the bar code for the printer 104, and sends the drawing information to the printer driver. As for the other character information 703, the application only notifies the printer driver of the information indicating which characters are to be recorded at which position, and a process for drawing the character information is performed on the printer driver.

Figure 8:
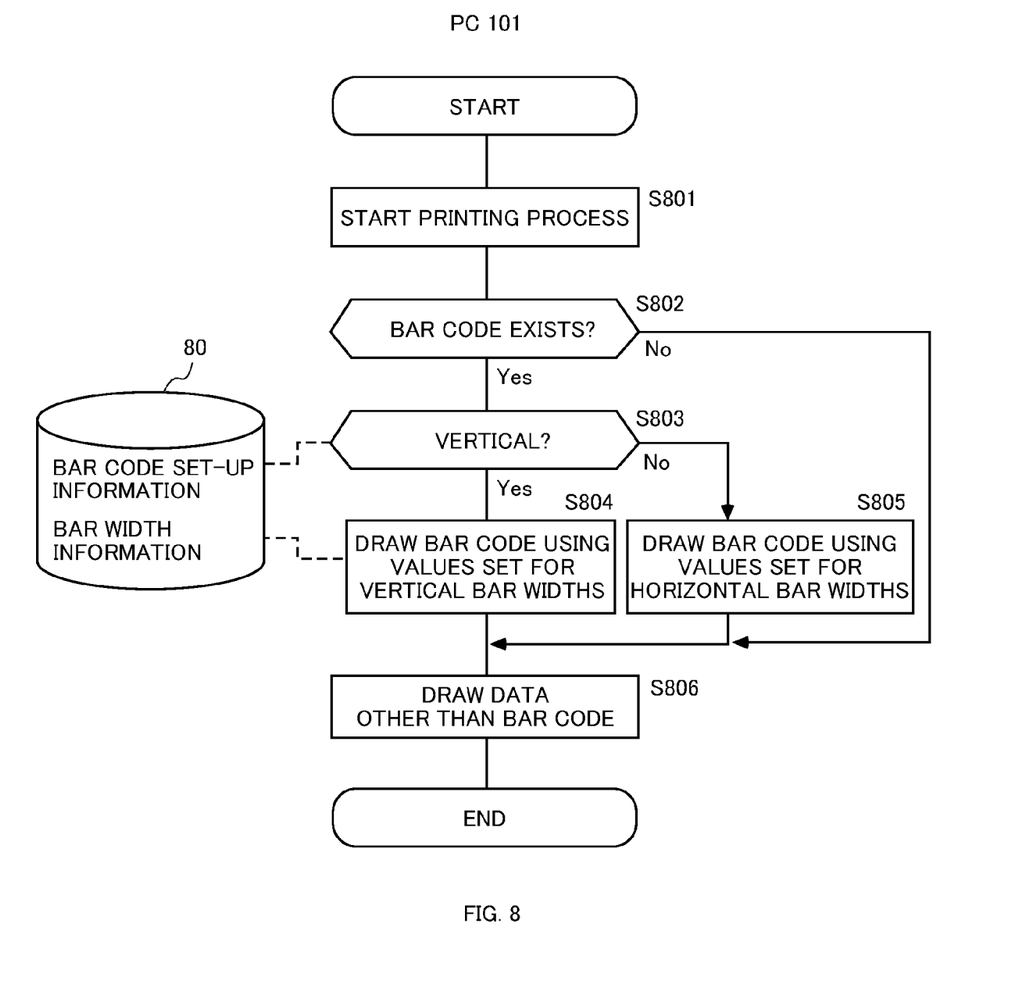
FIG. 8 is a flowchart showing a process when the bar code printing is performed from the application according to an embodiment of the present invention.

Next, FIG. 8 is a flow chart showing a process when the bar code printing is performed from the application. The storage such as the HDD 202 in the PC 101 stores a program defining an execution procedure for the process, and the CPU 201 reads out, interprets, and executes the program, to implement the process.

When there is a print request from the user, the application starts the printing process (S801). Next, it is determined whether or not there is a bar code in the print area (S802). If a bar code exists within the area, it is determined subsequently, whether the bar code is vertical or horizontal (S803). This determination is made based on the bar code set-up information ("block rotation angle" in FIG. 4) that is stored in storage 80. The storage 80 may be the HDD 202, for example (FIG. 2). If it is a vertical bar code, drawing is performed by using the bar width set-up values for the vertical orientation (S804), whereas if it is a horizontal bar code, drawing is performed by using the bar width set-up values for the horizontal orientation (S805). In any of the cases above, the bar width is determined by referring to the bar width information stored in the storage 80. When the bar code is drawn, the application transfers the information created by itself to the printer 104 in units of pixel, thereby enabling a reliable control in units of dot. Subsequently, the drawing process other than the bar code drawing is performed (S806), and the print process is completed.

It is to be noted that the printer driver exists between the application and the printer 104, and this printer driver processes the drawing data which is transferred from the application to generate print data, and transmits the print data to the printer 104.

Next, a second embodiment of the present invention will be explained. The first embodiment is directed to a configuration that generates bar code data in the PC, and transmits print data to the printer. On the other hand, the present embodiment is directed to a method in which a storage area such as RAM on the printer side receives a bar code value, barcode set-up information, bar width information, and the like, which are transmitted from the PC, and the printer generates a bar code therein.

Figure 9:
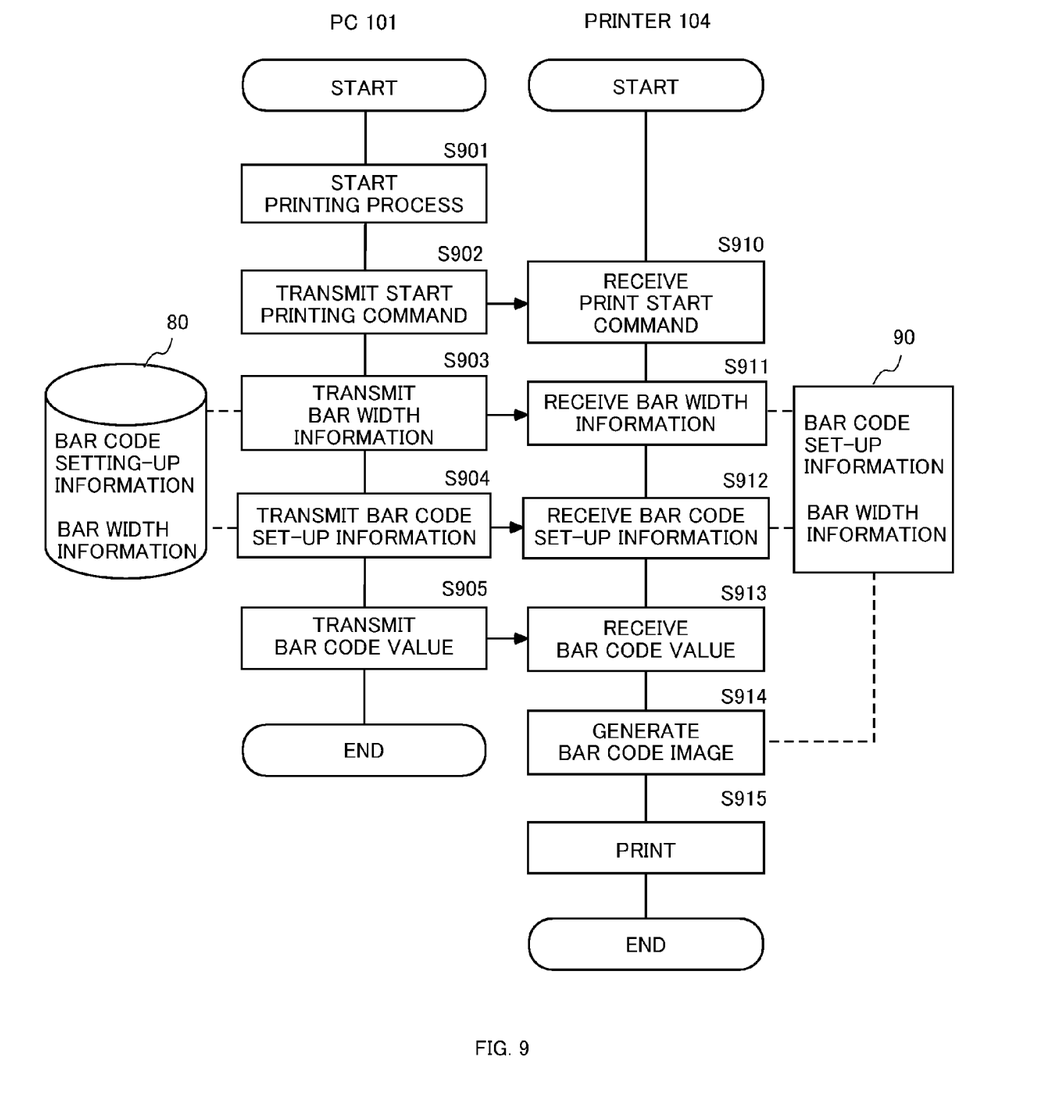
FIG. 9 is a flowchart showing a printing process according to an embodiment of the present invention.

FIG. 9 is a flowchart showing a printing process according to the present embodiment. As for the process on the PC 101 side, the storage such as the HDD 202 in the PC 101 stores a program defining the execution procedure, and the CPU 201 reads out, interprets, and executes the program to implement the process. As for the process on the printer 104 side, the storage such as the ROM 222 stores a program defining the execution procedure and the CPU 221 reads out, interprets, and executes the program to implement the process.

The PC starts the printing process from an application (S901) Next, the application in the PC transmits a printing start command to the printer 104 (S902). The printer receives the print start command, and starts preparation before printing (S910).

Next, the PC transmits bar width information of the bar code set in FIG. 3 to the printer (S903). The printer receives this bar width information of the barcode (S911). The storage 90 within the printer 104 stores the bar width information, preferably, in a non-volatile manner. This storage 90 may be a rewritable non-volatile memory (e.g., flash ROM or the like) of the ROM 222 as shown in FIG. 2.

Next, in the PC, the application transmits detailed set-up information regarding the bar code to the printer (S904). What is transmitted here may be a type of the bar code, a rotation angle of the bar code, fonts and font sizes of the bar code, and the like.

The printer receives the bar code set-up information as described above regarding the bar code generation (S912). The storage 90 further stores the bar code set-up information therein.

Next, the application transmits the value of bar code to the printer (S905). The printer receives the value of bar code (S913). Subsequently, the printer generates a bar code associated with the value of bar code, by referring to the bar code set-up information and the bar width information within the storage 90 (S914), and prints the bar code (S915).

The printer 104 may acquire from the PC 101, the bar width information and the bar code set-up information every time when the bar code is printed. However, it is alternatively possible to configure such that the once acquired information items of the bar code set-up information and the bar width information may be stored in the storage 90 in a non-volatile manner, and thereby the bar code can be generated without the necessity of further receiving those information items from the PC 101, as far as there is no subsequent change in the information. It is further possible to store plural information items as to the bar code set-up information and the bar width information, respectively for the types of bar code. In addition, the bar code set-up information and the bar width information may be stored for each type of paper. Furthermore, since those information items are stored in the storage 90 in a non-volatile manner, even when the printer is broken down and a user changes the printer, the bar code set-up information and the bar width information specific to each printer can be reflected thereto.

Figure 11:
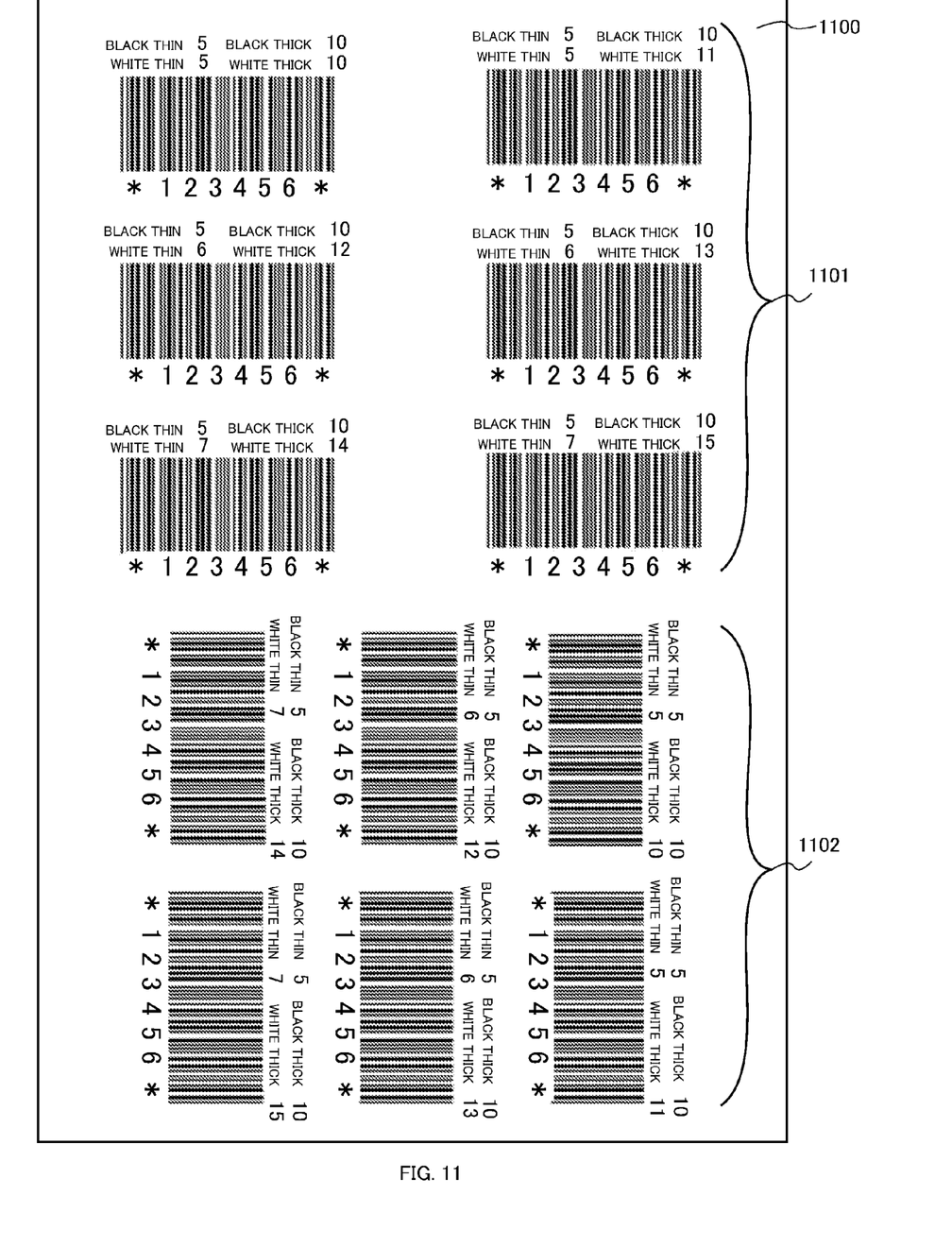
FIG. 11 illustrates a configuration example of bar code test patterns being useful for a user to determine the bar width information to be inputted in the bar width set-up screen.

FIG. 11 shows a configuration example of the bar code test patterns 1100, which can be used by a user for deciding the bar width information to be inputted into the bar width set-up screen 310. These test pattern examples are arranged within one page, including a group of six vertical bar codes 1101, each being a combination of different bar widths, and similarly, a group of six horizontal barcodes 1102, each being a combination of different bar widths. In proximity to each of the bar codes, there described numerical values being the number of dots, representing bar widths of black thin bar, black thick bar, white thin bar, and white thick bar, respectively. These values are just indicated values, and it is unknown whether or not the actual bar widths correspond to these values. Those test patterns being printed out are individually read by a known bar code verifier. The bar code verifier has a capability to determine a result of reading compared to an already-known bar code value, and evaluate the bar code by ranking its quality. The user uses the bar width information having at least a predetermined level of rank, as the bar width information to be inputted in the bar width set-up screen 310.

It is to be noted that the number of the bar codes within one page has been set six, for each of the vertical and horizontal bar codes, but the number is not limited thereto. Furthermore, the test patterns may be placed over two pages or more.

While the embodiments according to the present invention have been explained as described above, it should be understood that disclosed embodiments are susceptible of changes and modifications. By way of example, the number of recording heads, the color of ink, line type/scanning type, and the like, are not particularly limited.

What is claimed is:

1. A method for selectively printing a vertical bar code and a horizontal bar code which are approximately orthogonal to each other, comprising the steps of:

displaying a bar width set-up screen including entry fields for inputting bar widths of a black thin bar, a black thick bar, a white thin bar, and a white thick bar, respectively, as to the vertical bar code, and entry fields for inputting bar widths of a black thin bar, a black thick bar, a white thin bar, and a white thick bar, respectively, as to the horizontal bar code, and storing the bar width information inputted from the bar width set-up screen in the storage, displaying the bar width set-up screen that includes a check field for setting the same values to the bar widths of corresponding bars between the horizontal bar code and the vertical bar code, setting the bar widths, in case a checkmark is placed in the check field, in such a manner that the bar widths of one bar code agree with the bar widths of the other bar code between the vertical and horizontal bar codes, storing bar width information in a storage, independently for each of the vertical and horizontal bar codes, determining, in case a bar code is printed, an orientation of the bar code as to whether the bar code is vertical or horizontal, and drawing an image of the bar code by reading out the bar width information of the bar code corresponding to the orientation as a result of determination.

2. A computer readable recording medium which records a program for selectively printing a vertical bar code and a horizontal bar code which are approximately orthogonal to each other, allowing a computer to execute the steps of:

displaying a bar width set-up screen including entry fields for inputting bar widths of a black thin bar, a black thick bar, a white thin bar, and a white thick bar, respectively, as to the vertical bar code, and entry fields for inputting bar widths of a black thin bar, a black thick bar, a white thin bar, and a white thick bar, respectively, as to the horizontal bar code, and storing the bar width information inputted from the bar width set-up screen in the storage, displaying the bar width set-up screen that includes a check field for setting the same values to the bar widths of corresponding bars between the horizontal bar code and the vertical bar code, setting the bar widths, in case a checkmark is placed in the check field, in such a manner that the bar widths of one bar code agree with the bar widths of the other bar code between the vertical and horizontal bar codes storing bar width information in a storage, independently for each of the vertical and horizontal bar codes, determining, in case a bar code is printed, an orientation of the bar code as to whether the bar code is vertical or horizontal, and drawing an image of the bar code by reading out the bar width information of the bar code corresponding to the orientation as a result of determination.

3. A bar code generator for selectively generating a vertical bar code and a horizontal bar code approximately orthogonal to each other, comprising, a storage unit for storing bar width information independently for each of the vertical and horizontal bar codes, a bar code generating unit for generating an image of a bar code according to a designation of bar code orientation, based on a bar code value being provided, by referring to the bar width information corresponding to the bar code orientation being designated, said bar code generator being a printer, for generating and printing the image of the bar code, based on information items of the bar code value, bar code set-up information, and the bar width information, the information items being supplied from outside via the communication interface, and further comprising, a display unit for displaying a bar width set-up screen including entry fields for inputting bar widths of a black thin bar, a black thick bar, a white thin bar, and a white thick bar, respectively, as to the vertical bar code, and entry fields for inputting bar widths of a black thin bar, a black thick bar, a white thin bar, and a white thick bar, respectively, as to the horizontal bar code, wherein, the storage unit stores the bar width information that is inputted via the bar width set-up screen, and wherein, the bar width set-up screen includes a check field for setting the same values to the bar widths of corresponding bars between the horizontal bar code and the vertical bar code, and in case a checkmark is placed in the check field, the bar widths are set in such a manner that the bar widths of one bar code agree with the bar widths of the other bar code between the vertical and horizontal bar codes.

4. The bar code generator according to claim 3, wherein, the storage unit stores the bar width information for each bar code type.

5. The bar code generator according to claim 3, wherein, the storage unit stores the bar width information for each paper type on which printing is performed by the printer.

6. The bar code generator according to claim 3, wherein, the storage unit stores the bar width information for each printer.

\* \* \* \* \*